United States Patent
Lynar et al.

(10) Patent No.: US 9,742,618 B2
(45) Date of Patent: *Aug. 22, 2017

(54) RESILIENT ROUTING BASED ON A MULTI-CHANNEL MODEL FOR EMERGENCY MANAGEMENT

(71) Applicant: INTERNATIONAL BUSINESS MACHINES CORPORATION, Armonk, NY (US)

(72) Inventors: Timothy M. Lynar, Carlton Victoria (AU); Christian Vecchiola, Carlton Victoria (AU)

(73) Assignee: International Business Machines Corporation, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/711,438

(22) Filed: May 13, 2015

(65) Prior Publication Data
US 2015/0244651 A1  Aug. 27, 2015

Related U.S. Application Data

(63) Continuation of application No. 13/680,806, filed on Nov. 19, 2012, now Pat. No. 9,148,336.

(51) Int. Cl.
*H04L 29/14* (2006.01)
*H04W 40/38* (2009.01)
(Continued)

(52) U.S. Cl.
CPC ............ *H04L 29/14* (2013.01); *H04L 1/1607* (2013.01); *H04L 45/28* (2013.01); *H04L 49/557* (2013.01);
(Continued)

(58) Field of Classification Search
CPC ......... H04W 64/00; H04W 4/02; H04W 4/22; H04W 72/0406; H04W 72/1215;
(Continued)

(56) References Cited

U.S. PATENT DOCUMENTS 7,453,825 B1 * 11/2008 Sivasankaran .... H04L 12/40182
370/216
7,545,754 B2   6/2009 Funato et al.
(Continued)

OTHER PUBLICATIONS

Anonymous, "Mobile Ad Hoc Networks (MANETs) Are Note a Fundamentally Flawed Architecture", http://www.cs.rutgers.edu/~rmartin/teaching/fall04/cs552/papers/012.pdf. (9 pages).
(Continued)

*Primary Examiner* — Candal Elpenord
*Assistant Examiner* — Ricardo Castaneyra
(74) *Attorney, Agent, or Firm* — Tutunjian & Bitetto, P.C.; Louis J. Percello

(57) ABSTRACT

There is provided a system and method for resilient routing based on a multi-channel model for emergency management. The system includes a packet delivery anomaly detector for determining an existence of an anomaly in a mandated routing infrastructure for a packet that renders the packet incapable of reaching a destination node designated for the packet through the mandated routing infrastructure. The system further includes a dynamic alternate route identifier for dynamically identifying alternate routes for the packet responsive to a determination of the existence of the anomaly. The alternate routes are outside the mandated routing infrastructure, are provided using one or more mobile devices external to and not part of the mandated routing infrastructure, and are dynamically identified responsive to at least geographic location information. The system also includes a wireless transmitter for wirelessly routing the packet using at least one of the alternate routes.

9 Claims, 9 Drawing Sheets

(51) Int. Cl.

| | | |
|---|---|---|
| *H04L 12/703* | (2013.01) | |
| *H04L 1/16* | (2006.01) | |
| *H04L 12/939* | (2013.01) | |
| *H04W 4/22* | (2009.01) | |
| *H04W 40/20* | (2009.01) | |
| *H04L 29/06* | (2006.01) | |
| *H04W 24/04* | (2009.01) | |

(52) U.S. Cl.
CPC .............. *H04L 69/14* (2013.01); *H04L 69/40* (2013.01); *H04W 4/22* (2013.01); *H04W 40/20* (2013.01); *H04W 40/38* (2013.01); *H04W 24/04* (2013.01)

(58) Field of Classification Search
CPC ..... H04W 24/02; H04W 24/04; H04W 24/08; H04W 36/0016; H04W 36/30; H04W 36/14; H04W 36/22; H04W 40/20; H04W 40/38; H04W 68/00; H04W 28/0289; H04W 28/02; H04W 28/08; H04W 28/0247; H04W 28/04; H04W 8/08; H04W 76/007; H04W 88/02; H04L 29/14; H04L 69/40; H04L 69/14; H04L 1/1607; H04L 49/557; H04L 45/28
See application file for complete search history.

(56) References Cited

U.S. PATENT DOCUMENTS

| | | | |
|---|---|---|---|
| 2006/0083243 A1* | 4/2006 | Igarashi | H04L 45/02 370/392 |
| 2007/0214046 A1 | 9/2007 | Falchuk et al. | |
| 2009/0075625 A1* | 3/2009 | Jackson | H04W 4/22 455/404.1 |
| 2009/0129316 A1 | 5/2009 | Ramanathan et al. | |
| 2009/0313310 A1 | 12/2009 | Thome et al. | |
| 2010/0271934 A1 | 10/2010 | Holliday | |

OTHER PUBLICATIONS

De Cola et al., "Power and Bandwidth Effective Data Communications in Disaster Relief Operations Through a Satellite-Based Disruption Tolerant Network Paradigm" IEEE 2008, May 2008, pp. 1876-1880.

Link et al., "GeoDTN: Geographic Routing in Disruption Tolerant Networks" GLOBECOM 2011, Dec. 2011. (5 pages).

Mahdian et al., "GPS Assisted Adhoc Routing using Cell phones for Poorly Connected Areas" NSDR '10, Jun. 2010. (2 pages).

Miranda et al., "Adaptive Router Deployment for Multimedia Services in Mobile Pervasive Environments" PERCOM Workshops 2012, Mar. 2012. (4 pages).

Mugen et al., "Investigation of Architecture and Essential Technologies of Wireless Sensor Network" http://wwwen.zte.com.cn/endata/magazine/ztecommunications/2005year/no4/articles/200512/t20051220_162373.html. (7 pages).

Ng, "Wireless Mesh Network" http://www.apricot.net/apricot2004/doc/cd_content/25th%20February%202004/Internet%20Routing%20&%20Backbone%20Operations%20I/1%20-%20Danny%20Ng/Apricot%202004%20Wireless%20Mesh.pdf. (16 pages).

Ruhrup, "Theory and Practice of Geographic Routing" http://hondo.informatik.uni-freiburg.de/people/ruehrup/georouting-chapter-draft.pdf. Feb. 2009. (37 pages).

Tate et al., "Routing in Cellular Sensornets With Uniquely Identified Destination Nodes" http://www.google.co.in/url?sa=t&rct=j&q=&esrc=s&source=web&cd=2&ved=0CFUQFjAB&url=http%3A%2F%2Fciteseerx.ist.psu.edu%2Fviewdoc%2Fdownload%3Fdoi%3D10.1.1.167.5001%26rep%3Drep1%26type%3Dpdf&ei=-GfkT5DkN87nrAfEvcyOCQ&usg=AFQjCNGvXR9Exnvf6bhqASLrWVT6AjRJmw. Jun. 2012. (21 pages).

* cited by examiner

RESILIENT ROUTING BASED ON A MULTI-CHANNEL MODEL FOR EMERGENCY MANAGEMENT

CROSS-REFERENCE TO RELATED APPLICATIONS

This application is a Continuation application of co-pending U.S. patent application Ser. No. 13/680,806, filed on Nov. 19, 2012, incorporated herein by reference in its entirety.

BACKGROUND

Technical Field

The present principles relate generally to information routing and, in particular, to resilient routing based on a multi-channel model for emergency management.

Description of the Related Art

Emergency management scenarios often require the need for connectivity among units in order for the units to efficiently operate and address disruptions. Networking is one the elements that provide connectivity. However, networking is easily subject to disruptions during catastrophic events whether natural and/or man-made. Therefore, an "always available" communication network will make emergency management services more effective and ultimately more resilient.

SUMMARY

According to an aspect of the present principles, there is provided a system for resilient routing based on a multi-channel model for emergency management. The system includes a packet delivery anomaly detector for determining an existence of an anomaly in a mandated routing infrastructure for a packet that renders the packet incapable of reaching a destination node designated for the packet through the mandated routing infrastructure. The system further includes a dynamic alternate route identifier for dynamically identifying alternate routes for the packet responsive to a determination of the existence of the anomaly. The alternate routes are outside the mandated routing infrastructure, are provided using one or more mobile devices external to and not part of the mandated routing infrastructure, and are dynamically identified responsive to at least geographic location information. The system also includes a wireless transmitter for wirelessly routing the packet using at least one of the alternate routes.

According to another aspect of the present principles, there is provided a method for resilient routing based on a multi-channel model for emergency management. The method includes determining an existence of an anomaly in a mandated routing infrastructure for a packet that renders the packet incapable of reaching a destination node designated for the packet through the mandated routing infrastructure. The method further includes dynamically identifying alternate routes for the packet responsive to a determination of the existence of the anomaly. The alternate routes are outside the mandated routing infrastructure, are provided using one or more mobile devices external to and not part of the mandated routing infrastructure, and are dynamically identified responsive to at least geographic location information. The method also includes wirelessly routing the packet using at least one of the alternate routes.

According to yet another aspect of the present principles, there is provided a computer program product for providing resilient routing based on a multi-channel model for emergency management. The computer program product includes a computer readable storage medium having program code embodied therewith, the program code executable by a computer to perform a method. The method includes determining an existence of an anomaly in a mandated routing infrastructure for a packet that renders the packet incapable of reaching a destination node designated for the packet through the mandated routing infrastructure. The method further includes dynamically identifying alternate routes for the packet responsive to a determination of the existence of the anomaly. The alternate routes are outside the mandated routing infrastructure, are provided using one or more mobile devices external to and not part of the mandated routing infrastructure, and are dynamically identified responsive to at least geographic location information. The method also includes wirelessly routing the packet using at least one of the alternate routes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to resilient routing based on a multi-channel model for emergency management.

In an embodiment, the present principles combine geographic location information with the capability of leveraging nodes not normally belonging to the routing network.

In an embodiment, we introduce the capability of exploiting different transmission and opportunistic media in order to deliver data to a targeted area, when the standard communication channels used for networking are segmented and the target destination is not directly available. Even though, the identification of alternative paths to a destination is a normal behavior of routing algorithms, the present principles differ from such approaches is the use of different media, such as portable devices (e.g., cellular phone), which act as a bridge towards the location that is isolated. These portable devices are used in an opportunistic manner and do not normally belong to the set of nodes that are used to route packets. Moreover, this approach can be complemented with GPS information about the destination of packets, which help the portable devices to smartly join the routing algorithm, based on their location and the intended destination of the packet to be transmitted. In an embodiment, we exploit the opportunistic use of mobile devices and their location in order to provide alternate routes when the standard routing nodes are not reachable because of segmentation of the network.

Figure 1:
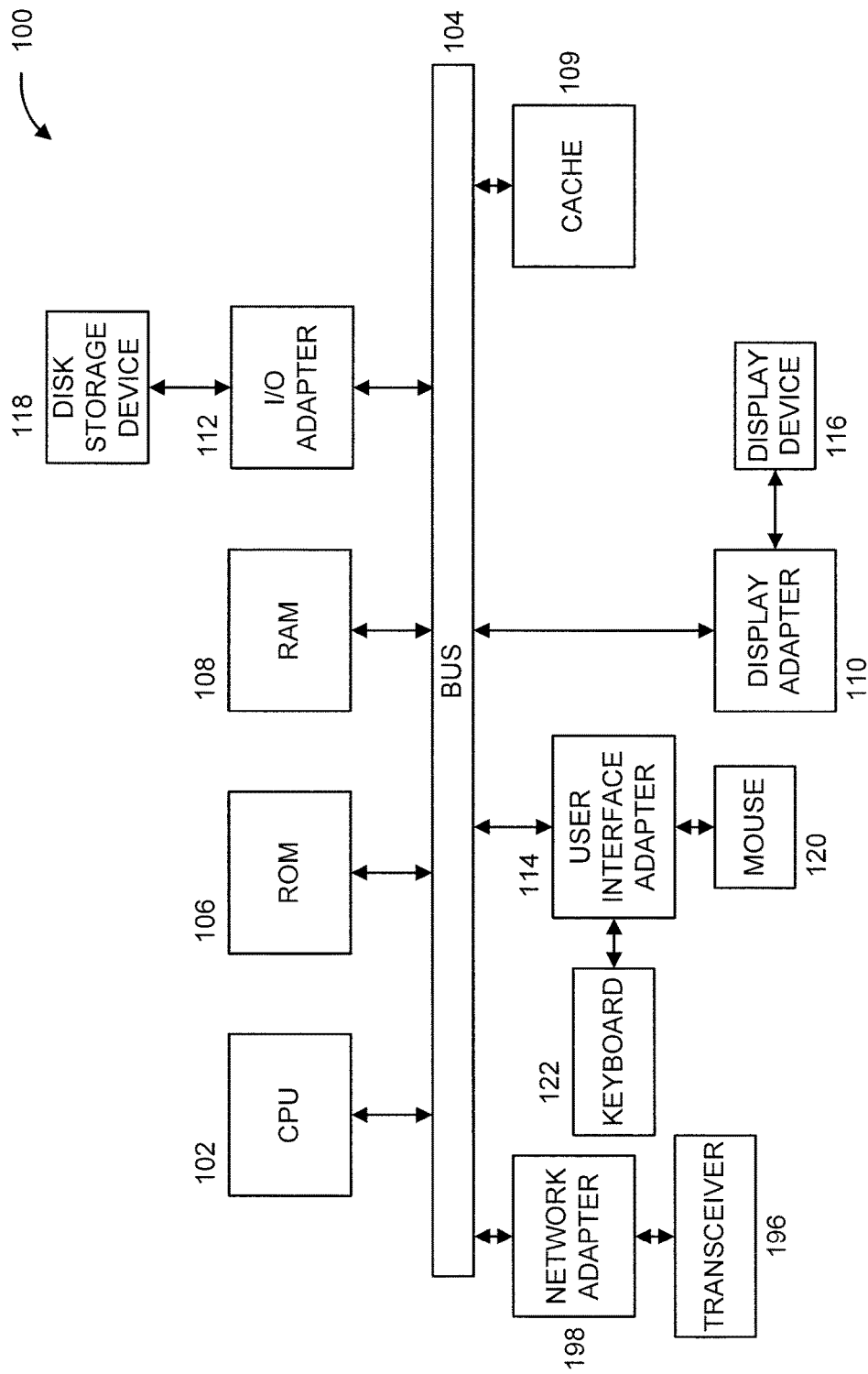
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an input/output (I/O) adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 214. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations as readily appreciated by one of ordinary skill in the art can also be utilized. These and other variations of the processing system 100 are readily contemplated by one of ordinary skill in the art given the teachings of the present principles provided herein.

Figure 2:
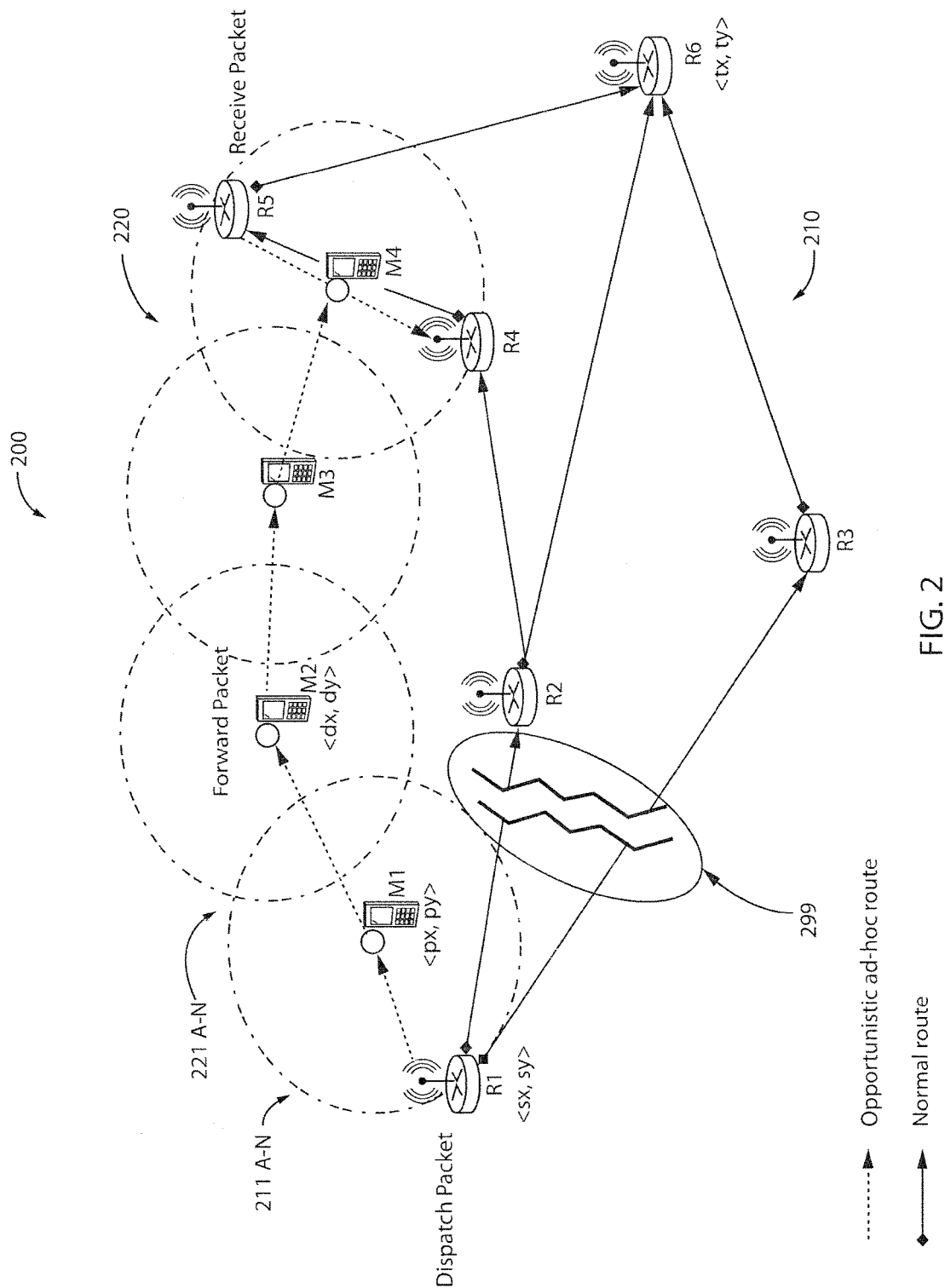
FIG. 2 shows an exemplary system 200 for resilient routing based on a multi-channel model for emergency management, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200. Also, it is to be appreciated that FIGS. 3 and 4 described below further show certain elements of system 200. Accordingly, part or all of processing system 100 can be implemented in one or more of the elements shown in FIGS. 3 and 4.

Figure 5:
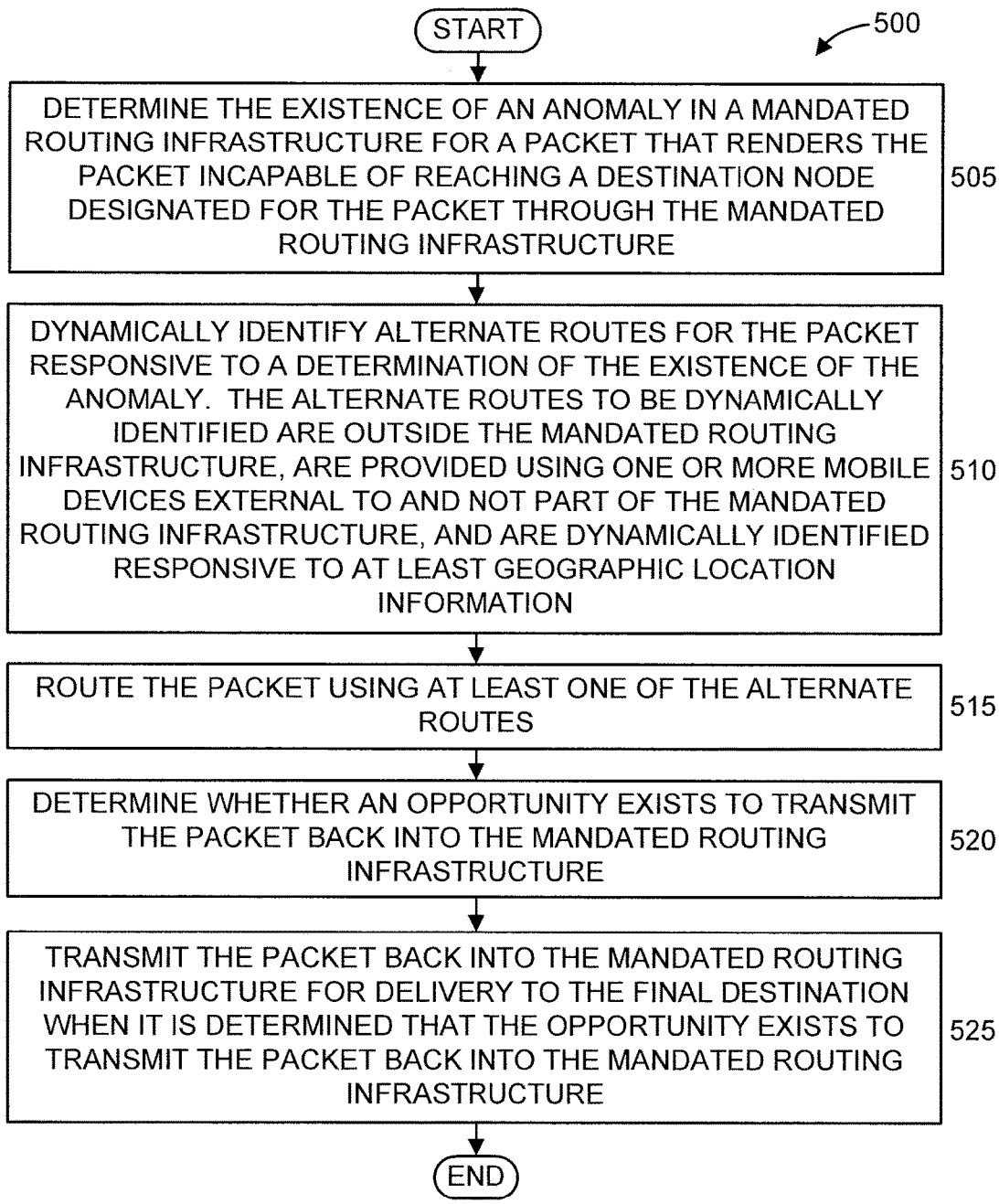
FIG. 5 shows an exemplary method 500 for resilient routing based on a multi-channel model for emergency management, in accordance with an embodiment of the present principles.
Figure 6:
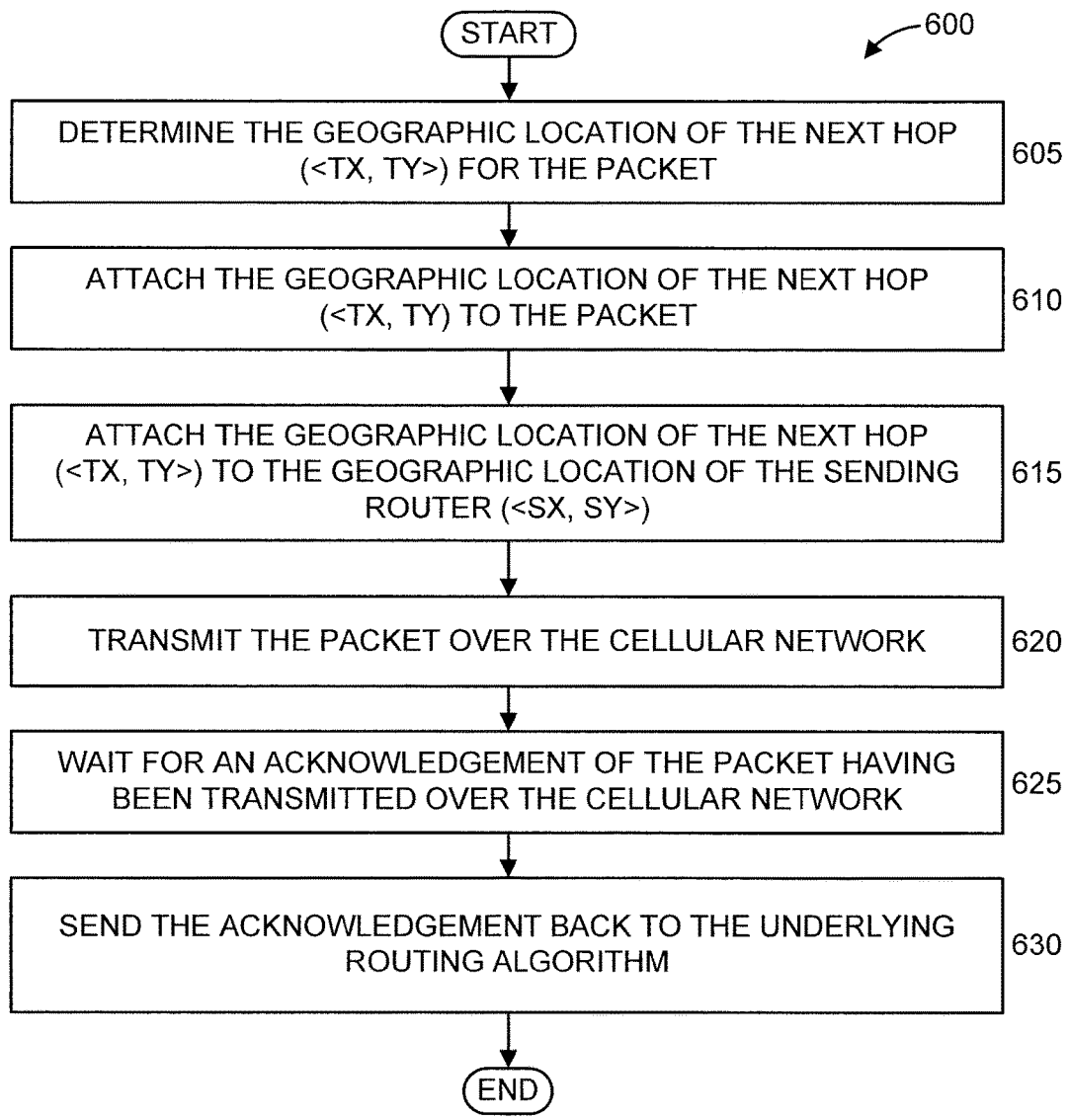
FIG. 6 shows an exemplary method 600 for resilient routing based on a multi-channel model for emergency management with respect to dispatching a packet from a router side, in accordance with an embodiment of the present principles.
Figure 7:
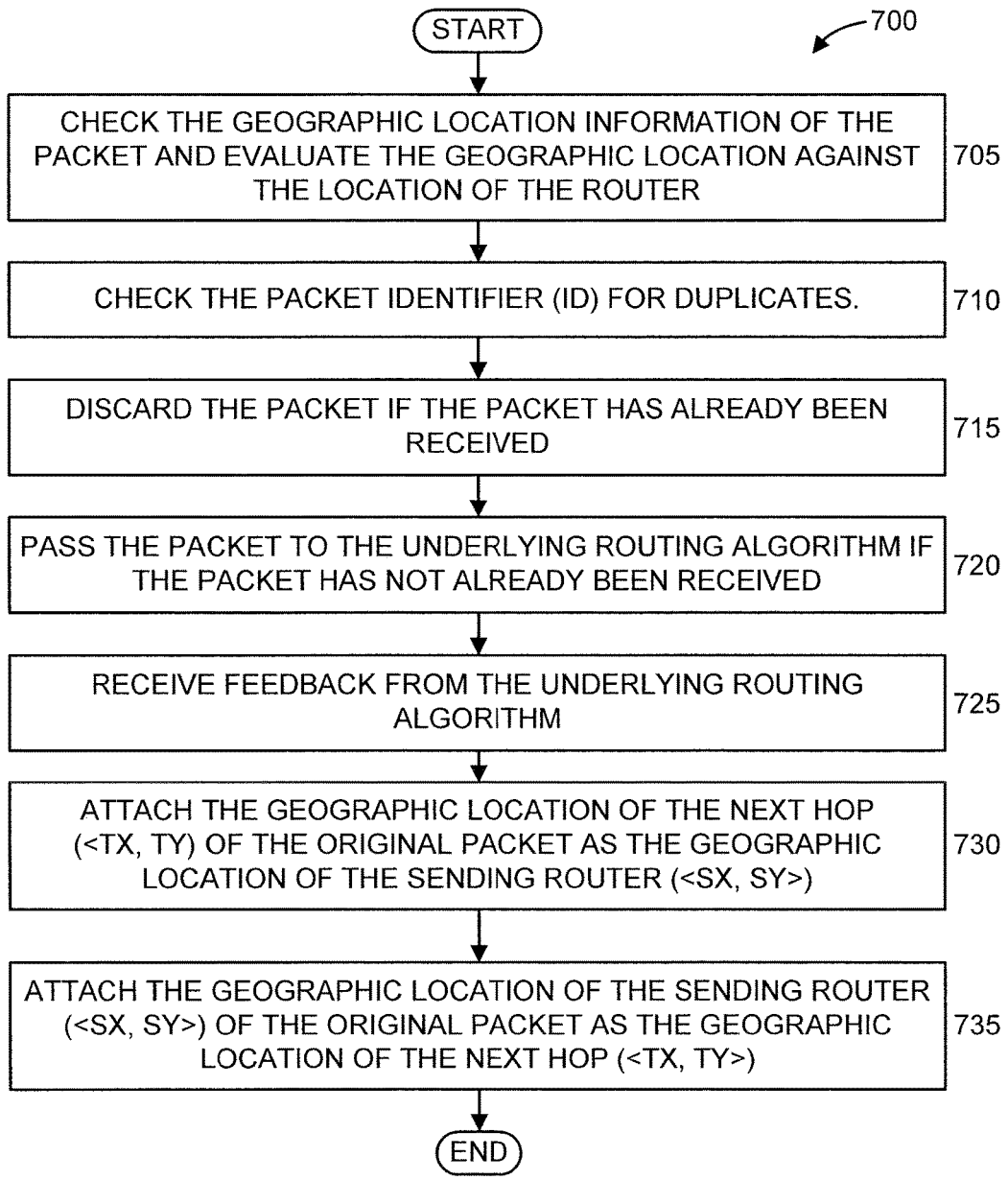
FIG. 7 shows an exemplary method 700 for resilient routing based on a multi-channel model for emergency management with respect to receiving a packet at a router side, in accordance with an embodiment of the present principles.
Figure 8:
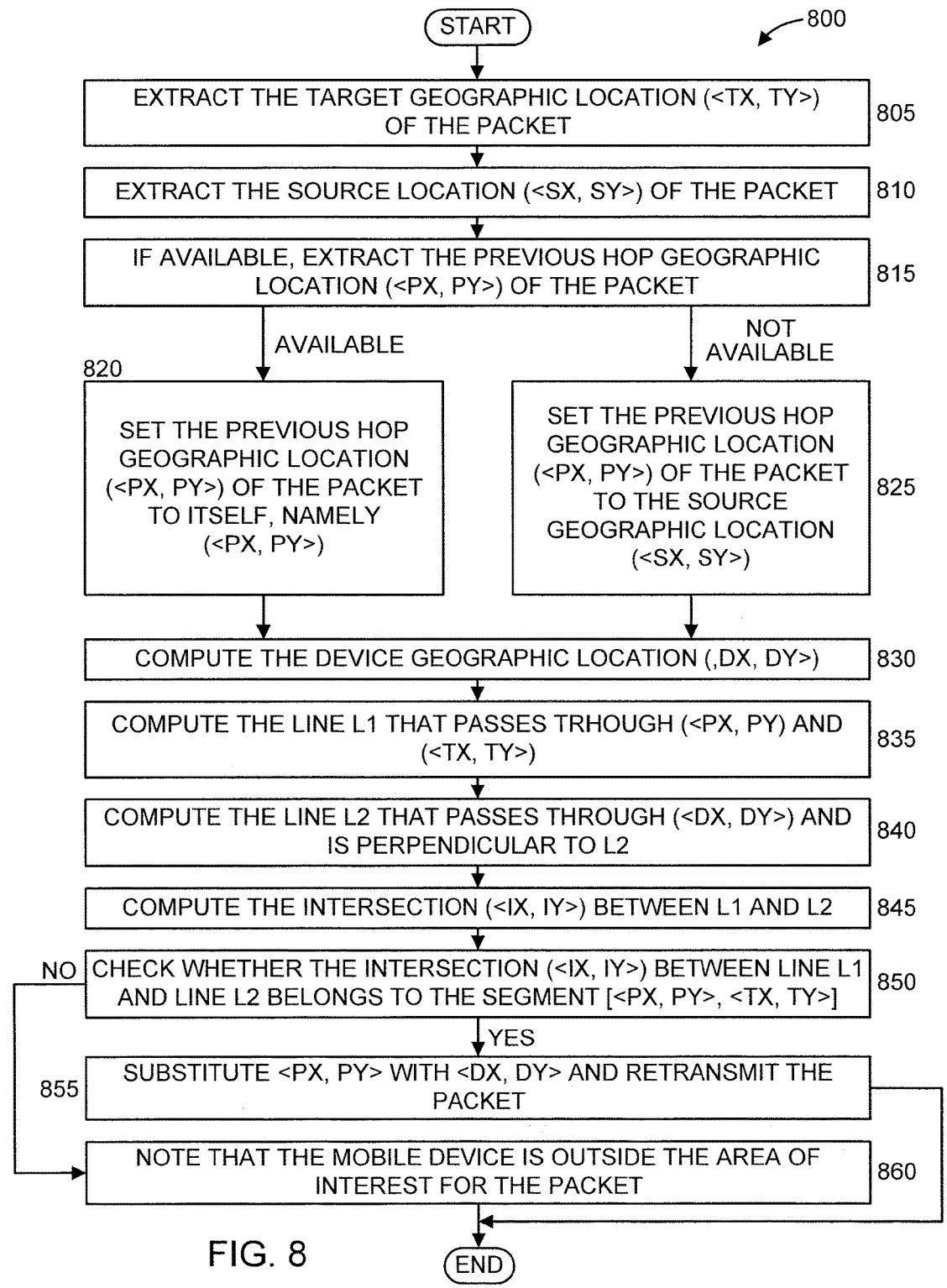
FIG. 8 shows another exemplary method 800 for resilient routing based on a multi-channel model for emergency management with respect to a mobile device side, in accordance with an embodiment of the present principles.

Moreover, it is to be appreciated that processing system 100 may perform at least part of the methods described herein including, for example, parts of method 500 of FIG. 5, parts of method 600 of FIG. 6, parts of method 700 of FIG. 7, and/or parts of method 800 of FIG. 8.

FIG. 2 shows an exemplary system 200 for resilient routing based on a multi-channel model for emergency management, in accordance with an embodiment of the present principles. The system 200 can also be considered to be an exemplary environment to which the present principles can be applied, in accordance with an embodiment of the present principles.

In the embodiment of FIG. 2, as described more fully herein below, a mandated routing infrastructure is used as a primary and essentially a sole routing infrastructure. That is, in most cases, the mandated routing infrastructure is the sole routing infrastructure to be used for conveying information, with the exception of when anomalies exist in the mandated routing structure that prevent a packet or other information structure from reaching its' intended destination. Thus, in most cases, the mandated routing infrastructure is the only infrastructure used to route such packets or other information.

In the embodiment of FIG. 2, it is to be appreciated that the mandated routing infrastructure is a default routing structure used to route packets for a given purpose(s) and/or entity(ies). Such purpose(s) and/or entity(ies) are intended to include and/or otherwise involve, but are not limited to, high priority communications such as those relating to emergency management. Moreover, in the embodiment, it is to be further appreciated that the mandated routing infrastructure is normally without any other available routing solutions in the event of the existence of the anomaly such as, for example, a segmentation 299 of the mandated routing infrastructure. However, in an embodiment and for the purposes of the present principles, one or more modifications can be made to one or more elements of the mandated routing infrastructure, and/or existing capabilities of one or more elements of the mandated routing infrastructure can be exploited, and/or other routing infrastructures, devices, and/or capabilities may be imparted and/or otherwise exploited by the mandated routing infrastructure in order to obtain and implement the advantages of the present principles.

The system 200 includes a mandated routing infrastructure 210 and a cellular network 220. It is to be appreciated that the selection of a cellular network such as network 220 is for the sake of illustration and the present principles are not limited to solely use with the same. For example, other types of networks and/or combinations of networks can also be used to exploit the present principles while maintaining the spirit of the present principles, given the teachings of the present principles provided herein. For example, Wi-Fi, wireless local area networks (WLANs), wireless wide area networks (WWANs), and so forth can also be used, as readily appreciated by one of ordinary skill in the art.

The mandated routing infrastructure 210 includes a plurality of routers 211A-N (for the sake of brevity, not all of the routers are shown). For the sakes of illustration and simplicity, routers that are part of the mandated routing infrastructure 210 can also be designated in the FIGURES by the letter R followed by an integer (e.g., R1, R2, R3, R4, R5, R6, etc.). Of course, the mandated routing infrastructure 210 is not limited to any particular number of routers and can, thus, involve any number of routers, while nonetheless being capable of being used in accordance with the present principles.

The cellular network 220 includes a plurality of mobile devices 221A-N (for the sake of brevity, not all of the mobile devices are shown). For the sakes of illustration and simplicity, mobile devices that are part of the cellular network 220 can also be designated in the FIGURES by the letter M followed by an integer (e.g., M1, M2, M3, M4, etc.). Of course, the cellular network 220 is not limited to any particular number of mobile devices and can, thus, involve any number of mobile vices, while nonetheless being capable of being used in accordance with the present principles.

Other elements of the mandated routing infrastructure 210 and the cellular network 220 are omitted from FIG. 2 for the sake of simplicity.

The normal route/routing used by the mandated routing infrastructure is shown in a solid line, and the opportunistic ad-hoc route/routing in accordance with the present principles is indicated by a dashed line. Moreover, for the sake of illustration, we use the following conventions regarding geographic locations that can be implicated by various embodiments of the present principles:

(1) target geographic location=(<tx, ty>);
(2) source geographic location=(<sx, sy>); and
(3) previous hop geographic location=(<px, py>).

Figure 3:
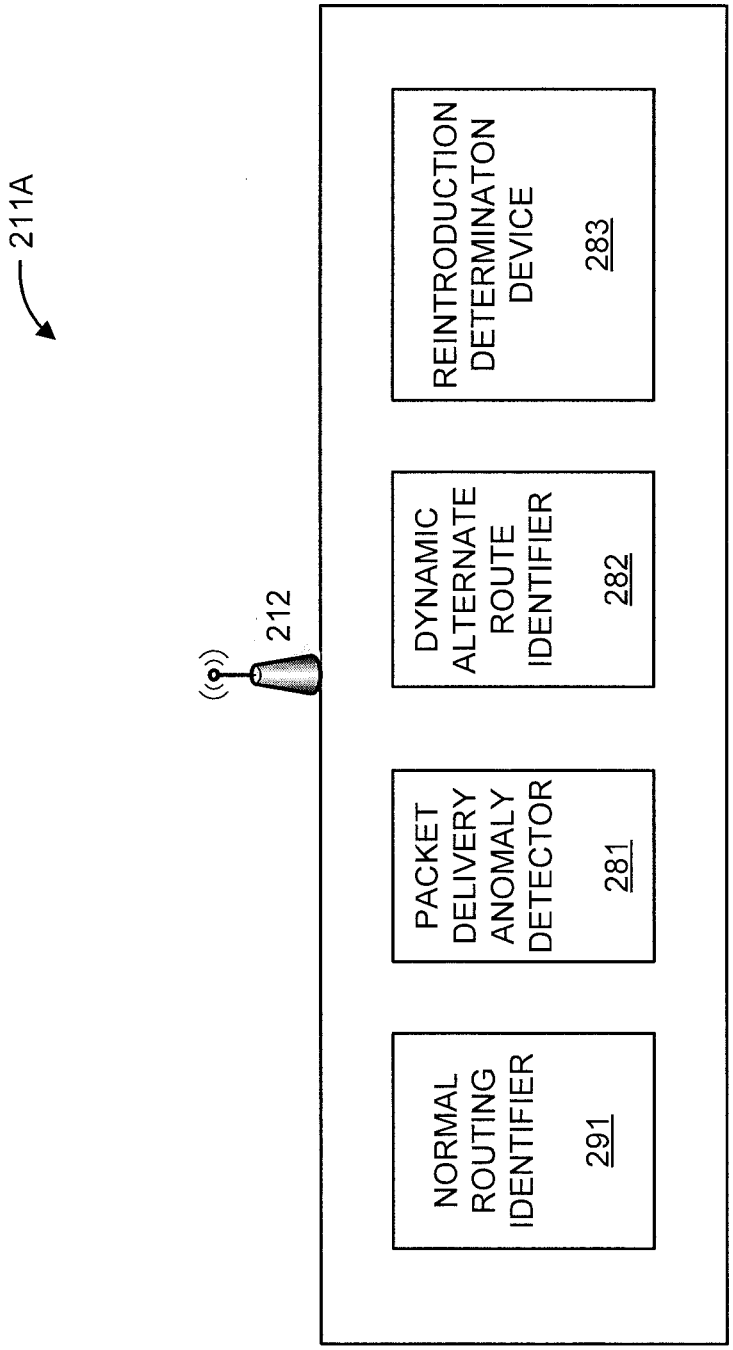
FIG. 3 further shows an exemplary router 211A from system 200, in accordance with an embodiment of the present principles.
Figure 4:
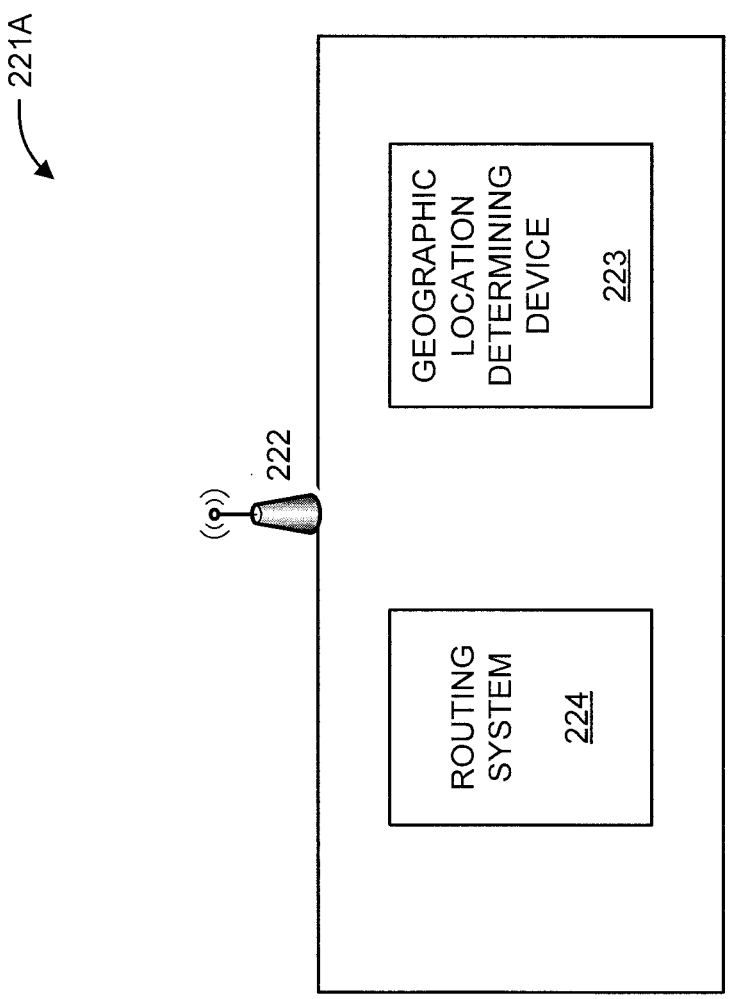
FIG. 4 further shows an exemplary mobile device 221A from system 200, in accordance with an embodiment of the present principles.

FIG. 3 further shows an exemplary router 211A from system 200, in accordance with an embodiment of the present principles. FIG. 4 further shows an exemplary mobile device 221A from system 200, in accordance with an embodiment of the present principles. Accordingly, the following description is to be considered in view of FIGS. 2, 3, and 4, as well as FIG. 1, since elements of FIG. 1 can be included in any of the elements of FIGS. 2, 3, and 4, as mentioned above and readily understood by one of ordinary skill in the art.

In an embodiment, system 200 includes a packet delivery anomaly detector 281, a dynamic alternate route identifier 282, and a reintroduction determination device 283. It is to be appreciated that the packet delivery anomaly detector 281, the dynamic alternate route identifier 282, and the reintroduction determination device 283 can be located anywhere in system 200, depending upon the implementation.

For the sake of illustration, the packet delivery anomaly detector 281, the dynamic alternate route identifier 282, and the reintroduction determination device 283 are shown in an exemplary router 211A described particularly with respect to FIG. 3 herein. In this configuration, one or more of these elements will receive information from the cellular network 210 and/or specifically one or more of the mobile devices device 221A-N. However, in another embodiment, the dynamic alternate route identifier 282 can be located in the cellular network 210 and/or specifically, in one or more of the mobile devices 221A-N.

Furthermore, in an embodiment, the packet delivery anomaly detector 281, the dynamic alternate route identifier 282, and the reintroduction determination device 283 can be distributed among more than one router or within any other element shown or not shown that is part of the mandated routing infrastructure 210 and/or the cellular network 220. Moreover, they can be implemented in whole or in part in any of the mandated routing infrastructure 210 or the cellular network 220. These and other variations are readily contemplated and implemented by one of ordinary skill in the art, given the teachings of the present principles provided herein.

In an embodiment, the packet delivery anomaly detector 281 determines the existence of an anomaly in a mandated routing infrastructure 210 for a packet that renders the packet incapable of reaching a destination node designated for the packet through the mandated routing infrastructure 210.

In an embodiment, the dynamic alternate route identifier 282 dynamically identifies alternate routes for the packet responsive to a determination of the existence of the anomaly by the packet delivery anomaly detector 281. The alternate routes to be dynamically identified are outside the mandated routing infrastructure 220 (e.g., through the cellular network 220), are provided using one or more mobile devices external to and not part of the mandated routing infrastructure 200 (e.g., any of the plurality of mobile devices 221A-N), and are dynamically identified responsive to at least geographic location information (e.g., provided by the geographic location determining device 223, or another element of the cellular network 210 and/or the mandated routing infrastructure 220).

In an embodiment, the reintroduction determination device 283 determines whether an opportunity exists to transmit the packet back into the mandated routing infrastructure 210 for delivery to the destination responsive to the packet passing through a plurality of the one or more mobile devices 221A-N of the cellular network 220.

In an embodiment, each of the plurality of routers 211A-N includes a normal routing identifier 291 that solely identifies routes within the mandated routing infrastructure 210. While shown separate for the sake of illustration, the functions of the normal routing identifier 291 and the dynamic alternate route identifier 282 can be combined in a single element. However, as noted herein, in an embodiment, the functions of the dynamic alternate route identifier 282 can be initiated only upon the detection of an anomaly by the packet delivery anomaly detector 281.

In an embodiment, each of the plurality of routers 211A-N includes and/or is otherwise able to make use of a respective radio frequency (RF) transmitter and/or transceiver (hereinafter simply referred to as RF transmitter 212 for the sake of simplicity). The RF transmitter 212 provides each router with the capability to interface with the cellular network 220 through, for example, one or more of the plurality of mobile devices 221A-N.

In an embodiment, the plurality of mobile devices 221A-N can include, but are not limited to, mobile cellular phones, mobile tablets, mobile personal digital assistants (PDAs), mobile laptops, and so forth. It is to be appreciated that the preceding list is merely illustrative and not exhaustive.

In an embodiment, each of the plurality of mobile devices 221A-N includes a respective transceiver 222, a geographic location determining device 223, and a routing system 224. The preceding elements can be already existing in a given mobile device or added to supplement the given mobile device as readily appreciated by one of ordinary skill in the art.

The transceiver 222 of any given mobile device (e.g., 221A) can receive and/or transmit packets from, for example, any of the routers 211A-N, any of the other mobile devices (e.g., 221B-N), and so forth. Of course, other elements of the cellular network 220 can also interface with the mobile devices 221A-N and be exploited for the purposes of the present principles.

The geographic location determining device 223 of any given mobile device (e.g., 221A) can determine its own current location (e.g., using the geographic location determining device 223) and can be further enabled to determine other geographic and location features and parameters such as direction of movement and so forth (e.g., using global positioning system (GPS) technology, and so forth) as readily appreciated by one of ordinary skill in the art. Such GPS technology can be included in the geographic location determining device 223 or a supplement device within any given mobile device 221A-N, as readily appreciated by one of ordinary skill in the art.

The routing system 224 of any given mobile device (e.g., 221A) can determine a next location to which to forward a packet that was unable to be fully transmitted over the mandated routing infrastructure 210. The determination can involve one or more algorithms, as processed by a corresponding processor and memory (not shown in FIG. 2, see FIG. 1 and corresponding text) included in the given mobile device (e.g., 221A). In this way, an optimal decision can be determined to expeditiously forward a given packet as necessary to its ultimate destination albeit through one or more of the mobile devices 221A-N.

Various embodiments of the present principles will now be described in view of the following algorithms. However, it is to be appreciated by one of ordinary skill in the art that modification to the embodiments may be readily implemented by one of ordinary skill in the art depending upon the specific implementation, given the teachings of the present principles provided herein.

FIG. 5 shows an exemplary method 500 for resilient routing based on a multi-channel model for emergency management, in accordance with an embodiment of the present principles.

At step 505, determine the existence of an anomaly in a mandated routing infrastructure for a packet that renders the packet incapable of reaching a destination node designated for the packet through the mandated routing infrastructure.

At step 510, dynamically identify alternate routes for the packet responsive to a determination of the existence of the anomaly. The alternate routes to be dynamically identified are outside the mandated routing infrastructure, are provided using one or more mobile devices external to and not part of the mandated routing infrastructure, and are dynamically identified responsive to at least geographic location information.

At step 515, route the packet using at least one of the alternate routes.

At step 520, determine whether an opportunity exists to transmit the packet back into the mandated routing infrastructure.

At step 525, transmit the packet back into the mandated routing infrastructure for delivery to the final destination when it is determined that the opportunity exists to transmit the packet back into the mandated routing infrastructure.

It is to be appreciated that step 505, and hence the steps that follow, can be repeated as necessary in order to ensure delivery of a given packet as anomalies in the mandated routing infrastructure occur and dissipate and/or are otherwise bypassed via the alternate routes. As examples, but certainly not exhaustive, the frequency or even initiation of performing step 505 (and/or any other following step) can result from an indication from the mandated routing infrastructure itself. For example, the mandated routing infrastructure can be configured to detect anomalies and/or inabilities of packets reaching one or more subsequent hops in a sequence of hops. Alternatively or in addition, other predetermined criteria, a predetermined frequency (or frequencies), and randomly, and so forth can be used to initiate step 505 (and/or any other following step). Of course, given that the present principles are directed to resilient routing based on a multi-channel model for emergency management, redundancy in anomaly detection and/or simply packet delivery failure in any form is certainly an acceptable option to initiate step 505 and/or any other following step and is likely preferred in many implementations of the present principles.

We initially note that the following methods 600, 700, and 800 described herein below relate to various features and/or functions of various portions and/or elements directed to an embodiment of the present principles. To that end, we note that the present principles are not limited to solely these methods and their corresponding details and other methods as well as variations of these methods and corresponding details can be readily implemented to achieve the advantageous features of the present principles, given the teachings of the present principles provided herein, while maintaining the spirit of the present principles.

Hence, while a cellular network can be referred to in one or more of method 600, method 700, and/or method 800, other types of networks can also be used. We further note that reference to the "underlying routing algorithm" is a general term and also implicates the underlying routing infrastructure such as the mandated routing infrastructure 200 described above with respect to FIG. 2. We additionally note that the term "next hop" can be the immediately next hop or a subsequent next hop, depending on the state of the anomalies, as readily appreciated by one of ordinary skill in the art.

FIG. 6 shows an exemplary method 600 for resilient routing based on a multi-channel model for emergency management with respect to dispatching a packet from a router side, in accordance with an embodiment of the present principles.

At step 605, determine (e.g., lookup) the geographic location of the next hop (<tx, ty>) for the packet.

At step 610, attach the geographic location of the next hop (<tx, ty>) to the packet.

At step 615, attach the geographic location of the next hop (<tx, ty>) to the geographic location of the sending router (<sx, sy>).

At step 620, transmit the packet over the cellular network.

At step 625, wait for an acknowledgement of the packet having been transmitted over the cellular network.

At step 630, send the acknowledgement back to the underlying routing algorithm.

FIG. 7 shows an exemplary method 700 for resilient routing based on a multi-channel model for emergency management with respect to receiving a packet at a router side, in accordance with an embodiment of the present principles.

At step 705, check the geographic location information of the packet and evaluate the geographic location information against the location of the router.

At step 710, check the packet identifier (id) for duplicates. For example, it might be possible that this packet has already been received.

At step 715, discard the packet if the packet has already been received.

At step 720, pass the packet to the underlying routing algorithm if the packet has not already been received.

At step 725, receive feedback from the underlying routing algorithm. Such feedback can involve, for example, an acknowledgement message, and/or so forth.

At step 730, attach the geographic location of the next hop (<tx, ty>) of the original packet as the geographic location of the sending router (<sx, sy>).

At step 735, attach the geographic location of the sending router (<sx, sy>) of the original packet as the geographic location of the next hop (<tx, ty>).

Regarding steps 730 and 735, the attached geographic locations (that is, the inverted coordinates) can be provided via respective acknowledgement packets. These acknowledgement packets can be sent through the mandated routing infrastructure in the case that the mandated routing infrastructure becomes available for use.

FIG. 8 shows another exemplary method 800 for resilient routing based on a multi-channel model for emergency management with respect to a mobile device side, in accordance with an embodiment of the present principles. In the embodiment of FIG. 6, it is presumed that the mobile device is equipped with global positioning system (GPS) capabilities and/or other location identifying capabilities.

At step 805, extract the target geographic location (<tx, ty>) of the packet.

At step 810, extract the source geographic location (<sx, sy>) of the packet.

At step 815, if available, extract the previous hop geographic location (<px, py>) of the packet. Thus, if the previous hop geographic location (<px, py>) of the packet is available, proceed to step 820. Otherwise, proceed to step 825.

It is to be appreciated that steps 805, 810, and 815 pertain to essentially extracting information from a received packet by a mobile device, and the steps that follow pertain to the mobile device processing the information in order to now forward the packet onward to its destination.

At step 820, set the previous hop geographic location (<px, py>) of the packet to itself, namely (<px, py>).

At step 825, set the previous hop geographic location (<px, py>) of the packet to the source geographic location (<sx, sy>) of the packet.

At step 830, compute the device geographic location (<dx, dy>).

At step 835, compute the line L1 that passes for (<px, py>) and (<tx, ty>).

At step 840, compute the line L2 that passes for (<dx, dy>) and is perpendicular to line L1.

At step 845, compute the intersection (<ix, iy>) between line L1 and line L2.

At step 850, check whether the intersection (<ix, iy>) between line L1 and line L2 belongs to the segment [(<px, py>), (<tx, ty>)]. If so, then proceed to step 855. Otherwise, proceed to step 860.

At step 855, substitute (<px, py>) with (<dx, dy>) and retransmit the packet.

At step 860, it is determined that the mobile device is outside the area of interest for the packet. In such a case, various options exist including, but not limited to, identifying a different mobile device within the area of interest for the packet.

Figure 9:
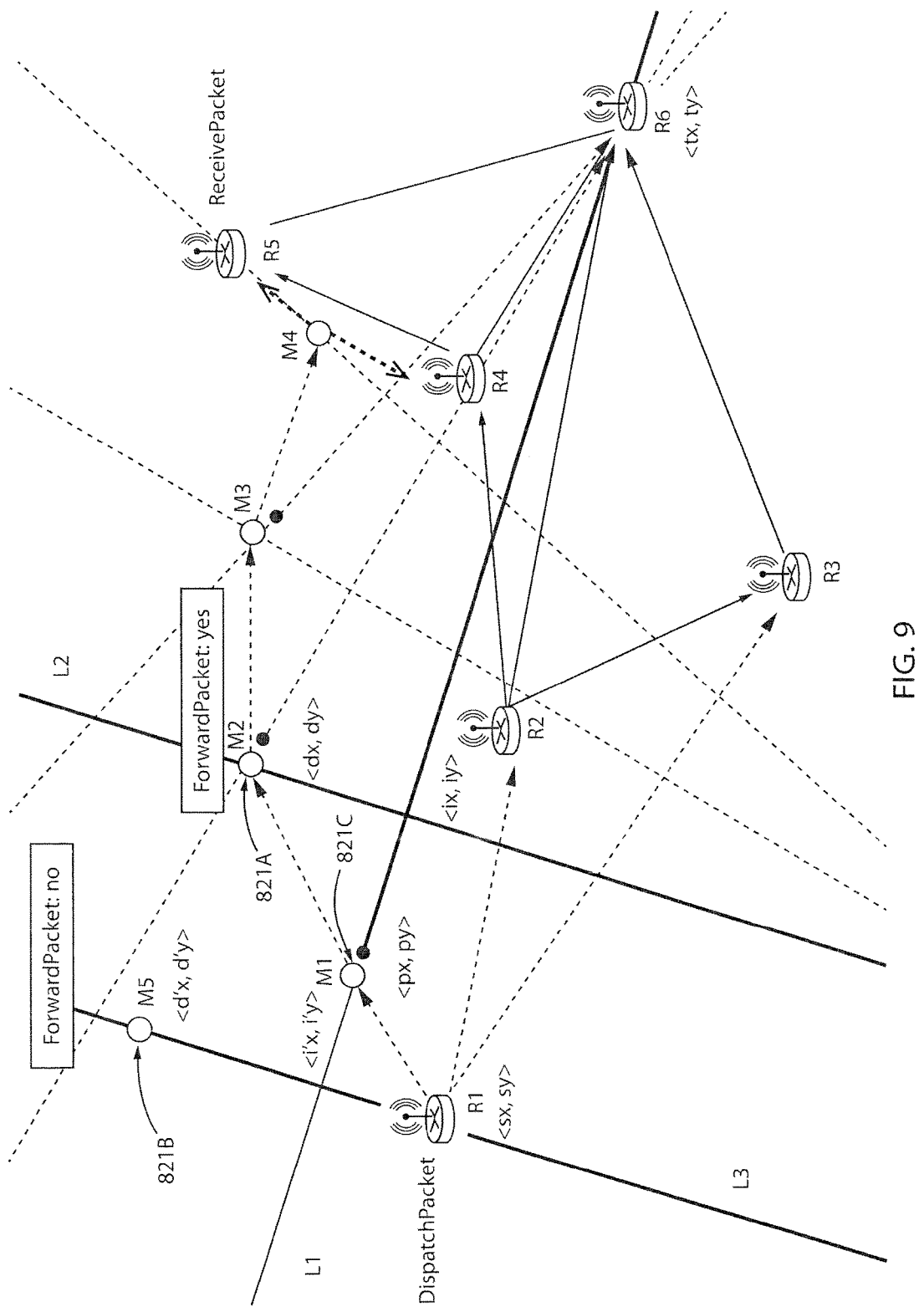
FIG. 9 shows an exemplary system 900 for resilient routing based on a multi-channel model for emergency management directed to exemplary methods 600, 700, and 800 of FIGS. 6, 7, and 8, respectively, in accordance with an embodiment of the present principles.

While described with respect to method 800, we will further describe the concepts relating to method 800 with respect to FIG. 9. FIG. 9 shows an exemplary system 900 for resilient routing based on a multi-channel model for emergency management directed to exemplary methods 600, 700, and 800 of FIGS. 6, 7, and 8, respectively, in accordance with an embodiment of the present principles.

Let us consider the source router R1 whose coordinates are (<sx, sy>) and the target router R6 located at (<tx, ty>). Due to a disruption between router R1 and routers R2 and R3, router R1 will use method 600 and dispatch the packets directed to router R6 to the mobile device 821C located at (<px, py>), which is in range. Since mobile device 821C brings the packets closer to the destination, mobile device 821C will retransmit the packet to the nearby devices. For the sake of illustration in FIG. 9, two mobile devices are in range: the first mobile device 821A is located at (<dx, dy>); and the second mobile device 821B is located at (<d'x, d'y>). Both the first mobile device 821A and the second mobile device 821B will receive the packet but only one will retransmit it, namely the first mobile device 821A.

For the first mobile device 821A, the method 800 will compute line L1 as the line including [(<px, py>), (<tx, ty>)] and will project its location (<dx, dy>) onto line L1. The projection is (<ix, iy>), which belongs to (that is, crosses/traverses) the [(<px, py>), (<tx, ty>)] segment. This means that the position of the first mobile device 821A is closer to the target destination and therefore retransmission increases the chances to reach the destination rather than being redundant.

For the second mobile device 821B, the method 800 will compute line L1 as described previously and will project its location onto line L1 (e.g., via line L3). The projection is (<i'x, i'y>), which does not belong to (that is, does not cross/traverse) the segment [(<px, py>), (<tx, ty>)]. This means that the second mobile device 821B is at a farther location with respect to the mobile device 821C from which the packet was received and therefore retransmission is less likely to bring the packet closer to the destination.

The method 800 also applies for the mobile device 821C located at (<px, py>) that will use the same method described above but it will project its location onto the line including [(<sx, sy>), (<tx, ty>)]. It can be easily noticed that for this case the projection of (<px, py>) falls within the segment [(<sx, sy>), (<tx, ty>)]. This is the condition that needs to be satisfied to retransmit the packet. Thus, FIG. 9 also shows the progression of lines and projections as the packet gets retransmitted and moves to the destination router R6.

The present principles combine geographic location information, capacity information, and the advanced capabilities of portable devices to set up ad-hoc networks that provide the capability to overcome disruptions in the standard routing network. The present principles are viable for providing alternative connectivity for high-priority low-bandwidth traffic, such as important messages whose delivery is crucial in the case of emergencies. In the absence of disruptions of network connectivity among routers, the normal routing algorithms and node selection processes apply. In the case of a lack of connectivity towards nodes that are required to deliver a packet, an alternate channel can be used. It is believed that due to the ubiquitous nature of cellular network, this alternative channel is a great advantage in overcoming the deficiencies of the prior art. In an embodiment, it is presumed that each router is equipped with a radio transmitter device able to tap into the cellular network. This requirement is not prohibitive since the same technology used for cellular phones can be used to integrate this function into routers. Once a given router has discovered a disruption, the router can then use a cellular antenna to deliver the packet through the cellular network. The packet includes geographic location information of the target, which can be used to reintroduce the packet into the network of routers and delivered to the end node.

Referring back to FIGS. 2 and 9, it is to be appreciated that the mobile devices receive and retransmit the packet thus allowing the packet to migrate close to its' intended destination. The use of geographic location information helps these devices in deciding whether they are along a potential path to reach the intended destination and whether or not to retransmit the packet along the potential path.

Since routing largely varies according to the type of network (size and complexity), it would be limiting to select a single routing algorithm and modify it to support the desired scenario. Moreover, it is to be appreciated that in an embodiment, the present principles do not have to operate at the finer details of the selection of the next hop, but simply provide a fallback approach when all the hops available to the default routing algorithm are not reachable. This condition activates the algorithms that embody the present principles disclosed herein.

As will be appreciated by one skilled in the art, aspects of the present principles may be embodied as a system, method or computer program product. Accordingly, aspects of the present principles may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present principles may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present principles may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present principles are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present principles. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for resilient routing based on a multi-channel model for emergency management, the method comprising:
    dynamically identifying alternate routes for a packet responsive to a determination of an existence of an anomaly in a mandated routing infrastructure for the packet, the alternate routes being outside the mandated routing infrastructure, being provided using one or more mobile devices external to and not part of the mandated routing infrastructure, and being dynamically identified responsive to at least a geographic location of a next hop for the packet;
    attaching to the packet the geographic location of the next bop for the packet;
    wirelessly routing the packet to the geographic location of the next hop through at least one of the one or more mobile devices using at least one of the alternate routes; and
    sending an acknowledgement to the mandated routing infrastructure responsive to wirelessly routing the packet to the geographic location of the next hop through, the at least one of the one or more mobile devices.

2. The method of claim 1, wherein the mandated routing infrastructure is a wired routing infrastructure having a default routing configuration that transmits packets via wired Connections.

3. The method of claim 1, wherein the mandated routing infrastructure provides packet routing that is constrained to only routes within the mandated routing infrastructure in an absence of the existence of the anomaly.

4. The method of claim 1, wherein only the determination of the existence of the anomaly triggers an initiation of said step of dynamically identifying the alternate routes.

5. The method of claim 1, wherein said step of wirelessly routing the packet using the at least one of the alternate, routes comprises wirelessly routing the packet to the one or more mobile devices using at least one radio frequency transmitter normally bypassed but comprised in or accessible by a router in the mandated routing infrastructure.

6. The method of claim 1, wherein the one or more mobile devices comprise at least one mobile wireless device capable of interfacing with a wireless network that is not part of the mandated routing infrastructure.

7. The method of claim 1, wherein the one or more mobile devices comprise at least one mobile telephone capable of interfacing with a cellular network that is not part of the mandated routing infrastructure.

8. The method of claim 1, further comprising passing the packet through at least one of the one or more mobile devices until an opportunity exists to transmit the packet back into the mandated routing infrastructure for delivery to a destination.

9. The method of claim 1, further comprising:
    receiving a different acknowledgement that an opportunity exists to transmit the packet back into the mandated routing infrastructure for delivery to a destination; and
    transmitting the packet from at least one of the one or more mobile devices back to a muter comprised in the mandated routing infrastructure responsive to the different acknowledgement.

* * * * *